United States Patent [19]
Gritzka

[11] 3,951,420
[45] Apr. 20, 1976

[54] ELASTIC ROLL RING

[76] Inventor: Waldemar H. R. Gritzka, Keilstr. 85, 463 Bochum-Linden, Germany

[22] Filed: Oct. 23, 1973

[21] Appl. No.: 408,866

[30] Foreign Application Priority Data
Oct. 26, 1972  Germany............................ 2252468
June 13, 1973  Germany............................ 2329952

[52] U.S. Cl....................... 277/207 R; 277/DIG. 2; 277/211; 285/344
[51] Int. Cl.²..................... F16L 19/00; F16L 21/02
[58] Field of Search.......... 277/207, 209, 211, 208, 277/DIG. 2; 285/344

[56] References Cited
FOREIGN PATENTS OR APPLICATIONS
1,250,700  9/1967  Germany........................ 277/DIG. 2
1,525,798  9/1969  Germany........................ 277/DIG. 2
1,802,287  5/1970  Germany........................ 277/DIG. 2

*Primary Examiner*—Samuel B. Rothberg
*Attorney, Agent, or Firm*—Merchant, Gould, Smith, Edell, Welter & Schmidt

[57] ABSTRACT

A roll ring for sealing socket-type joints is provided with a circumferentially extending lip having an abutment surface which is positioned to lie in a plane extending through the circumferential axis of the roll ring. The abutment surface tightly engages the outer circumferential surface of the insertion end of a first pipe subsequent to rotation of the ring against its natural bias about its circumferentially extending axis to position the roll ring on the insertion end. A groove is formed in the roll ring less than 180° distant from a back surface of the lip for the reception of the end of a socket of another pipe so as to position the insertion end for insertion into the socket. A circumferentially extending contact surface is disposed perpendicular to the abutment surface to engage the end of the insertion end and, with the natural bias of the roll ring, aids in rolling the roll ring into the space between the insertion end and socket end as the pipes are joined. The roll ring is constructed such that the lip and groove are disposed in a single plane extending parallel to the outer circumferential surface of the insertion end when the pipes are joined to provide a full width contact of the roll ring with the adjacent surfaces of the socket and insertion ends.

2 Claims, 4 Drawing Figures

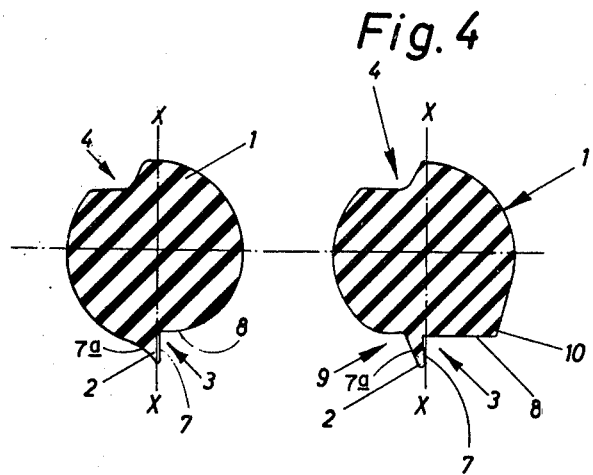
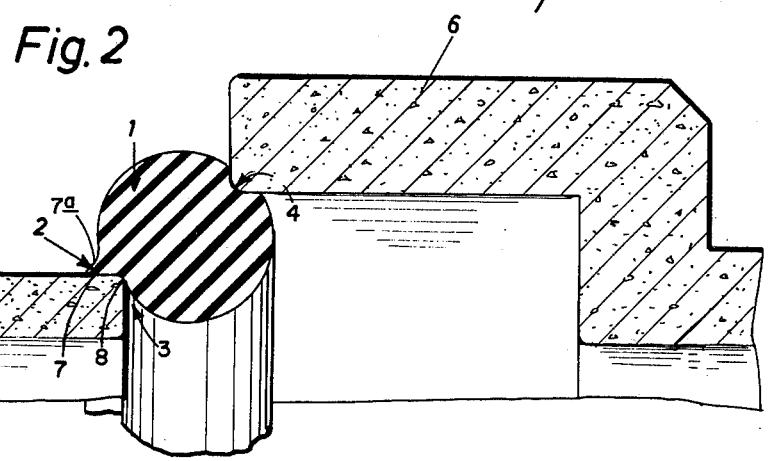
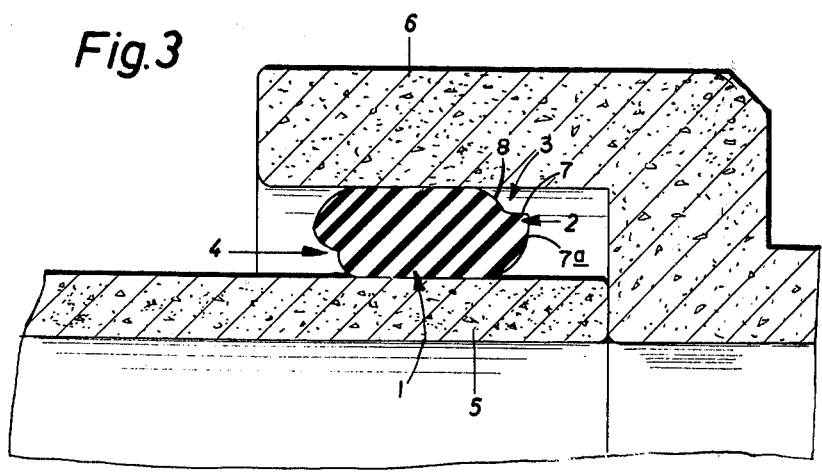

ELASTIC ROLL RING

BACKGROUND OF THE INVENTION

1. Field of the Invention:

The present invention relates generally to O-type sealing rings and more particularly is concerned with an elastic roll ring for socket-type connections of pipes.

2. Description of the Prior Art:

The prior art procedure used in connecting socket type connections of pipes consisted of providing an elastic sealing ring between the insertion and socket ends of a pair of pipes. The ring has a basically round profile and a circular cross section and is rolled into the socket end of one pipe when the insertion end of another pipe is inserted into the socket. With DT-OS 2,117,317, an arrangement was made known, whereby the roll ring is designed with a lip protruding beyond the circular cross sectional circumference of the ring, the lip extending in the direction of the circumference of the ring and also with a groove extending in the direction of the circumference of the ring. The groove is less than 180° distant from the back surface of the lip when the ring is viewed in cross section. In this arrangement, a vertical surface opposite the back surface of the lip forms a contact surface for the socket end of a pipe while the horizontal surface, which is perpendicular to the vertical surface, forms a contact surface for the insertion end of a pipe. Also, in this arrangement, the contact surface for the end of the socket pipe formed by the lip is specifically dislocated away from the area of the ring's central vertical plane as viewed from a cross section of one side of the ring, the result being a considerable weakening of the ring's cross section. This arrangement is intended, on the one hand, to make it possible to draw the ring around the socket end to hold it there without the use of special tools. On the other hand, the groove and the entrance of the insertion end into the groove, is intended to provide an exactly defined point of attack when the two pipes are pushed toward each other, thus causing the ring to roll. However, in the case of the prior art ring, the groove and the lip are formed in such a way that when the two pipe ends are pushed together and the ring is rolled into the space between them, the areas of weakness formed by the groove and the lip are located exactly in a so-called compaction between the inner surface of the socket and the outer surface of the insertion end of the pipe, with the result that the shearing stresses thus released cannot be controlled with certainty.

Further, with DT-AS 1,236,874 the idea was introduced of providing an elastic roll ring with an indentation extending roughly on a secant plane on the cross section of the ring so as to form a sealing and support lip protruding over the circumference of the ring. This lip is brought into contact with the remaining cross section of the ring when the pipes are pushed together, thus filling out the ring to a completely circular cross section. When installed, the end of the support end or sealing lip is likewise located directly in the compaction area, such that control of the sheering stresses and an adequate seal is not assured in this case either.

Summary of the Invention

The task of the invention is to shape the roll ring in such a way that, when it is installed, the ring makes full-width contact with the two adjacent pipe surfaces at the compaction area, whereby a secure positioning of the ring is achieved and, at the same time, the shearing stresses are controlled. The task underlying the invention is accomplished as follows:

a. the contact surface is generally located in the area of a vertical plane extending through the circumferentially extended axis of the ring as viewed from a cross section of the ring;

b. the lip consists of a small extension which protrudes over the circumference of the ring and of an indentation provided on the side opposite the back surface of the lip; and c. the groove is developed in familiar fashion in the form of a sector with an included angle of at least 90°, also as viewed from a cross section of the ring. By using these features in conjunction with each other, it becomes possible to securely center and hold the ring between the insertion end and/or socket end of two pipes.

Further, the lip and the groove work together in such a way as to prevent the ring from slipping on the inner side of the socket end and/or the outer side of the insertion end when the pipes are pushed together. Also, this arrangement assures that when the ring is in its final position inside the socket pipe connection, the lip and the groove are located on a single plane, e.g. a plane extending generally parallel to the outer circumference of the insertion pipe. This results in the fact that, in the compaction area between adjacent circumferential surfaces of the insertion and socket ends of the pipes, the roll ring makes full-width contact with the adjacent circumferential surfaces of the two pipes. This, in turn, assures that no shaking of the ground or similar movement of the pipes can cause the roll ring to slip out of the socket and also guarantees the necessary resistance to shearing stresses.

It is also the intention to provide a roll ring of the above-described type so as to achieve less resistance to being rolled into place while, at the same time, retaining all the advantages provided by the roll ring characterized above. Finally, it is the intention to increase the contact surface of the ring on the front end of the pipe so as to improve the adherence of the ring to the pipe. This is accomplished chiefly by amplifying or increasing the contact surface forming one side of the indentation by means of a nose which protrudes from the circular cross section of the ring. What is achieved by increasing the contact surface on the front side of the nose is that the ring is more securely held in place when installed on the end of a pipe, which feature is of great importance for the installation of the ring during conditions which are often wet and which often do not permit clear vision. These tasks, which will henceforth be assumed to underlie the invention are also resolved by providing an indentation adjacent the back surface of the lip. This indentation is formed by a spiral-like development on the circumferential surface of the circular cross section adjacent the back surface of the lip. Obviously, this arrangement permits the lip to fold into a vacant space when the ring is rolled into place, such that, when the ends of the pipe are pushed together, the lip does not create additional resistance to this action.

BRIEF DESCRIPTION OF THE DRAWINGS

FIG. 1 shows a cross sectional view through one side of a roll ring having a basically round profile;

FIG. 2 represents a fragmentary sectional view in which the roll ring of FIG. 1 is mounted on the insertion end of a pipe and the socket end of the other pipe is in contact with the roll ring;

FIG. 3 shows a sectional view similar to FIG. 2 in which the roll ring is installed between the insertion end and socket end of a pair of pipes; and FIG. 4 shows a modified version of the structure of FIG. 1.

DESCRIPTION OF THE PREFERRED EMBODIMENTS

The roll ring, which is generally designated by the numeral 1, has a basically circular cross section and has a small lip 2 which protrudes over the circumference of the circular cross section. The lip 2 consists, on the one hand, of the portion of the material which protrudes over the circumference of the circle and, on the other hand, of an indentation 3 which is oriented toward the center or circumferentially extending axis of the roll ring, thus amplifying the otherwise small size of the lip 2. The lip 2 provides an abutment surface 7 oppositely disposed to a back surface 7a. The abutment surface 7 is basically located in the area of a vertical plane indicated at X—X which extends through the circumferential axis of the roll ring 1 as viewed from the cross sectional showing of FIG. 1. A contact surface 8, disposed perpendicular to abutment surface 7 defines the indentation 3 and is provided for reasons which will hereinafter become apparent.

A groove 4 is formed in the side surface of the roll ring 1 in general opposition to lip 2. This groove 4 is developed as a sector having an included angle of at least 90° as viewed in the cross section of FIG. 1. This groove 4 is located in such a way that the interval separating it from the lip 2 (in a direction spaced from the back surface 7a of the lip 2) is less than 180°, i.e., groove 4 and lip 2 are not diametrically opposite each other when viewed in the cross section of the roll ring 1, but rather are slightly offset from a diametric relationship with each other in the direction of the back surface 7a.

In FIG. 2, the numeral 5 designates an insertion end of a first pipe and the numeral 6 a socket end of another pipe of a pair of pipes to be joined. The roll ring 1 is mounted on the insertion end 5, by rotating the ring 1 about its circumferential axis, so that abutment surface 7 is in contact with the outer circumference of the insertion end 5 and contact surface 8 is in contact with the outer end edge of the insertion end 5. In this position, the roll ring 1 tends to rotate back to its original position causing the contact surface 7 to tightly engage the outer circumferential surface of the insertion end 5. As shown in FIG. 2, the lowermost or inner edge of the outer end of socket end 6 may now be positioned in groove 4, whereby it is possible to slightly center the insertion end 5 relative to the socket end 6. Thus, it is possible for one worker to center the pipes to be joined and to push them together without the use of any technical devices.

It will be noted that the tendency for the roll ring 1 to rotate back to its original or unstressed condition exerts a bias in a direction which aids rolling movements of the roll ring 1 into the space between the insertion end 5 and socket end 6 when the pipes are pushed together. This is particularly helpful under conditions wherein the pipes might be wet, which condition may cause the roll ring 1 to slip instead of roll during the insertion process and cause an unwanted positioning of the roll ring 1 between the pipes which may result in a poor seal.

After the insertion end 5 is pushed into the socket end 6, the roll ring 1 is located roughly in the middle of the longitudinal length of the socket end 6 and has a basically elliptic cross sectional shape, see FIG. 3. In this position, lip 2 and groove 4 are now located substantially in a single plane, the orientation of which is basically parallel to the outer circumference of the insertion end 5, i.e., in the compaction area of the roll ring 1 between the outer and inner adjacent circumferential surfaces of the insertion end 5 and socket 6 respectively. In this manner, the roll ring 1 makes full width contact with both of the adjacent pipe surfaces.

In the modified version shown in FIG. 4, the back surface 7a of the lip 2 is provided with an indentation 9. The indentation 9 is formed by a spiral-like development of the surface area of the quarter of the circular cross section adjacent the back surface 7a. The indentation 9 serves to receive the lip 2 during the insertion of end 5 into socket 6 so that lip 2 does not create additional resistance to this action. The size of the indentation 3 in this embodiment is determined by the addition of a nose 10 which protrudes over the normal cross section of the roll ring 1. The nose 10 serves to provide a greater stabilizing contact surface 8 for engagement by the end edge of insertion end 5 to provide a more secure attachment of the roll ring 1 to the insertion end 5 during insertion of end 5 into socket 6.

What is claimed is:

1. A roll-type sealing ring of elastic material for application to the insertion end of a first conduit to be sealingly received in the socket end of a second conduit, said ring having a circumferentially extending ring axis and a body of a generally circular section normal to said axis, an inside diameter less than the outside diameter of said insertion end and an outside diameter greater than the inside diameter of said socket end;

said ring further having a lip projecting inwardly beyond the body of the ring and extending circumferentially therearound, said lip having an insertion-face-engaging front surface portion lying substantially in the plane of said ring axis when said ring is unstressed, said lip being joined to the body of said ring by a generally sloping rear surface portion forming an apex at the extremity of said lip, and a generally convex contact surface portion disposed generally perpendicular to said front surface portion, so that upon stressing said ring by partially rotating it about said ring axis said front surface portion of said lip may resiliently engage the outer surface of said insertion end and said contact surface portion may engage the end of said insertion end.

2. The structure of claim 1 in which the body of said ring includes a circumferential indentation at a location spaced around the circumference of said section, in the sense away from said surface of said lip, by less than 180°, whereby when said ring is installed on said insertion end of said first conduit, said indentation is positioned to receive the inner rim of said socket end of said second conduit.

\* \* \* \* \*